United States Patent
Takeda

(10) Patent No.: US 12,005,876 B2
(45) Date of Patent: Jun. 11, 2024

(54) BRAKING CONTROL DEVICE

(71) Applicant: SUBARU CORPORATION, Tokyo (JP)

(72) Inventor: Takashi Takeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 238 days.

(21) Appl. No.: 17/575,064

(22) Filed: Jan. 13, 2022

(65) Prior Publication Data

US 2022/0242376 A1 Aug. 4, 2022

(30) Foreign Application Priority Data

Feb. 4, 2021 (JP) .................. 2021-016379

(51) Int. Cl.
*B60T 7/00* (2006.01)
*B60T 7/12* (2006.01)
*B60T 8/171* (2006.01)

(52) U.S. Cl.
CPC .............. *B60T 7/122* (2013.01); *B60T 8/171* (2013.01); *B60T 2201/06* (2013.01); *B60T 2210/20* (2013.01); *B60T 2240/00* (2013.01); *B60T 2250/00* (2013.01)

(58) Field of Classification Search
CPC ...... B60T 7/122; B60T 8/171; B60T 2201/06; B60T 2210/20; B60T 2240/00; B60T 2250/00
See application file for complete search history.

(56) References Cited

U.S. PATENT DOCUMENTS

| | | | | |
|---|---|---|---|---|
| 2005/0246081 A1* | 11/2005 | Bonnet | .................... | B60T 7/122 280/5.502 |
| 2007/0090691 A1* | 4/2007 | Maskell | .................. | B60T 7/122 303/192 |
| 2007/0090692 A1* | 4/2007 | Kamikado | .............. | B60T 7/122 303/192 |
| 2007/0164608 A1* | 7/2007 | Streit | ...................... | B60T 7/122 303/146 |
| 2009/0306860 A1* | 12/2009 | Sokoll | ..................... | B60T 7/122 477/197 |

(Continued)

FOREIGN PATENT DOCUMENTS

| | | |
|---|---|---|
| JP | 2007-112294 A | 5/2007 |
| JP | 2014-100923 A | 6/2014 |
| JP | 2020-093617 A | 6/2020 |

*Primary Examiner* — Phutthiwat Wongwian
*Assistant Examiner* — Sherman D Manley
(74) *Attorney, Agent, or Firm* — Rimon P.C.

(57) ABSTRACT

A braking control device includes a stop holding controller and an uneven-ground traveling determination unit. After the vehicle makes a stop and a brake operation performed by a driver who drives the vehicle is canceled, the stop holding controller is configured to perform execution of a stop holding control that includes holding braking force of the vehicle and canceling the braking force in response to a predetermined start operation performed by the driver. The uneven-ground traveling determination unit is configured to determine whether the vehicle is traveling on an uneven ground. The stop holding controller is configured to disable the execution of the stop holding control in a case where the uneven-ground traveling determination unit determines that the vehicle is traveling on the uneven ground.

9 Claims, 3 Drawing Sheets

(56) References Cited

U.S. PATENT DOCUMENTS

2009/0309414 A1\* 12/2009 Braeuer ................. B60T 7/122
303/191
2014/0142825 A1\* 5/2014 Harada ................ B60T 13/146
701/70
2020/0180578 A1\* 6/2020 Watanabe ............... B60T 8/245

\* cited by examiner

BRAKING CONTROL DEVICE

CROSS-REFERENCE TO RELATED APPLICATIONS

The present application claims priority from Japanese Patent Application No. 2021-016379 filed on Feb. 4, 2021, the entire contents of which are hereby incorporated by reference.

BACKGROUND

The technology relates to a braking control device configured to perform stop holding.

To improve convenience in a vehicle, such as an automobile, some known vehicles have a stop holding function (e.g., an automatic vehicle hold (AVH) function) of, after the vehicle makes a stop in response to a driver's brake operation, holding braking force even if the brake operation is canceled, to keep the vehicle in a stopped state.

As an existing technique related to a vehicle having such a stop holding function, Japanese Unexamined Patent Application Publication (JP-A) No. 2007-112294, for example, discloses the following technique that is used in a vehicle having a stop holding function (e.g., a hill hold function) of preventing slip-down of the vehicle when the vehicle is stopped on a hill. When a hill hold control is executed on a slope of a low-μ road, such as a snowy road, the technique disclosed in JP-A No. 2007-112294 reduces a wheel cylinder fluid pressure of a brake of one or more wheels, in response to generation of a vehicle body acceleration during the execution of the hill hold control, to prevent deflection of the vehicle due to unexpected movement of the vehicle.

JP-A No. 2014-100923 discloses a technique of, during a stop holding control on a hill with a low-μ road surface, such as an icy road, canceling the stop holding control in a case where a behavior amount of a vehicle is equal to or greater than a predetermined value and where an operation member is operated, to enable appropriately recovery of the vehicle in a case where the vehicle slips down while turning.

JP-A No. 2020-93617 discloses a technique of, in a state in which a lateral slip prevention control is disabled, disabling a hill hold control in a case where a predetermined low-speed gear is selected in a transmission, and enabling the hill hold control in a case where another gear is selected.

SUMMARY

An aspect of the technology provides a braking control device to be applied to a vehicle. The braking control device includes a stop holding controller and an uneven-ground traveling determination unit. After the vehicle makes a stop and a brake operation performed by a driver who drives the vehicle is canceled, the stop holding controller is configured to perform execution of a stop holding control that includes holding braking force of the vehicle and canceling the braking force in response to a predetermined start operation performed by the driver. The uneven-ground traveling determination unit is configured to determine whether the vehicle is traveling on an uneven ground. The stop holding controller is configured to disable the execution of the stop holding control in a case where the uneven-ground traveling determination unit determines that the vehicle is traveling on the uneven ground.

An aspect of the technology provides a braking control device to be applied to a vehicle. The braking control device includes circuitry. After the vehicle makes a stop and a brake operation performed by a driver who drives the vehicle is canceled, the circuitry is configured to perform execution of a stop holding control that includes holding braking force of the vehicle and canceling the braking force in response to a predetermined start operation performed by the driver. The circuitry is configured to determine whether the vehicle is traveling on an uneven ground. The circuitry is configured to disable the execution of the stop holding control upon determining that the vehicle is traveling on the uneven ground.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

As concerned in the existing techniques described above, if a stop holding control is performed, for example, on an uneven ground, i.e., a low-μ road, such as an icy or snowy road, an unpaved road, or a muddy road, a vehicle can start a slip, or a slip-down, with its wheel locked, depending on an inclination of a road surface, for example.

In view of this, users have been informed to turn off the stop holding control during uneven ground traveling, but the users can forget such an operation. In addition, a user manually turning off the stop holding control during the uneven ground traveling can complicate operations and impair convenience of the vehicle.

Taking into consideration that a driver depresses a brake pedal when the slip starts, a technique of canceling braking force of the stop holding control in a case where a brake pedal depression operation is detected has also been proposed. In this case, however, if electrical noise is superimposed on an output of a sensor that detects depression of the brake pedal, the braking force can be erroneously canceled.

In JP-A Nos. 2007-112294 and 2014-100923, the stop holding control is enabled even during such uneven ground traveling, and the braking force is canceled after the slip of the vehicle actually starts. However, it is desired to prevent such a situation in which a slip occurs before it emerges.

It is desirable to provide a braking control device that makes it possible to prevent a vehicle from slipping due to a stop holding control on an uneven ground.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

First Example Embodiment

A braking control device according to a first example embodiment of the technology is described below.

The braking control device according to the example embodiment may be mounted on, for example, a four-wheeled automobile, such as a passenger car.

Figure 1:
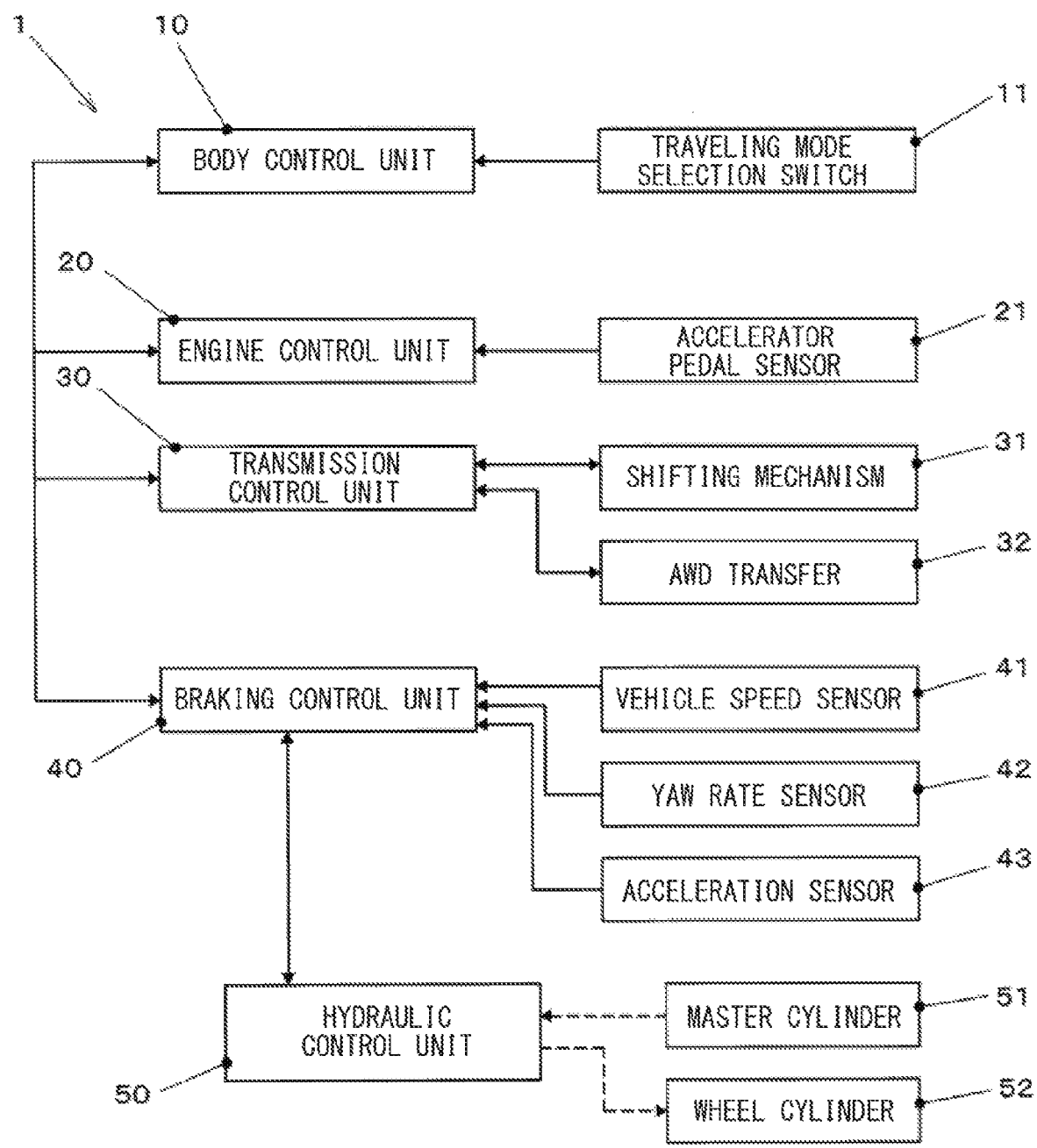
FIG. 1 is a block diagram schematically illustrating a system configuration of a vehicle including a braking control device according to one example embodiment of the technology.

FIG. 1 is a block diagram schematically illustrating a system configuration of a vehicle according to the first example embodiment.

A vehicle 1 may include a body control unit 10, an engine control unit 20, a transmission control unit 30, a braking control unit 40, and a hydraulic control unit 50, for example.

The body control unit 10, the engine control unit 20, the transmission control unit 30, and the braking control unit 40 may be configured as a microcomputer. The microcomputer may include, for example: an information processor such as a central processing unit (CPU); a storage device such as a random-access memory (RAM) or a read-only memory (ROM); an input-output interface; and a bus that couples these units to each other.

The body control unit 10, the engine control unit 20, the transmission control unit 30, and the braking control unit 40 may be coupled directly or via an on-board local area network (LAN) device such as a controller area network (CAN) communication system, to be able to communicate with each other.

The body control unit (BCU) 10 may be configured to comprehensively control various electrical components provided in a vehicle body of the vehicle 1.

In the first example embodiment, the vehicle 1 may be configured to allow a user, such as a driver, to select and switch between a normal mode suitable mainly for traveling on a smooth road (e.g., a paved road), and an uneven ground traveling mode suitable for traveling on an uneven ground, such as an icy or snowy road, an unpaved road, or a muddy road.

To the body control unit 10 may be coupled a traveling mode selection switch 11 serving as an operation device for the user to switch between the normal mode and the uneven ground traveling mode.

The engine control unit (ECU) 20 may be configured to comprehensively control an unillustrated engine and its auxiliaries. The engine may serve as a traveling power source of the vehicle 1.

To the engine control unit 20 may be coupled an accelerator pedal sensor 21.

The accelerator pedal sensor 21 may be configured to detect an operation amount, i.e., a depression amount, of an unillustrated accelerator pedal. The driver may input an accelerator operation via the accelerator pedal.

The engine control unit 20 may set a driver requested torque on the basis of an output of the accelerator pedal sensor 21, for example, and may control an output of the engine to make the actual torque of the engine match the driver requested torque.

The transmission control unit (TCU) 30 may be configured to comprehensively control, an unillustrated transmission and its auxiliaries. The transmission may change a speed of output shaft rotation of the engine and transmit the resulting rotation to drive wheels.

The transmission control unit 30 may be configured to give an instruction to a shifting mechanism 31 and an AWD transfer 32, for example.

The shifting mechanism 31 may be configured to change the speed of the output shaft rotation of the engine. The shifting mechanism 31 may include, for example, a variator of a chain CVT.

The AWD transfer 32 may include a transfer clutch that changes driving torque distribution to the front wheel side and the rear wheel side, and restrains differential rotation, i.e., a difference in rotational speed, between the front wheels and the rear wheels.

The transmission control unit 30 may set, in accordance with a traveling state of the vehicle 1, a target shifting ratio of the shifting mechanism 31 and transfer clutch engagement force of the AWD transfer 32.

The braking control unit 40 may serve as the braking control device that controls an unillustrated hydraulic service brake, i.e., a braking device, provided for each wheel of the vehicle.

In one embodiment, the braking control unit 40 may serve as a "stop holding controller" and an "uneven-ground traveling determination unit".

The braking control unit 40 may be configured to individually control a brake fluid pressure of a wheel cylinder 52 of each wheel, to cause the service brake of each wheel to generate braking force, by giving an instruction to the hydraulic control unit 50.

To the braking control unit 40 may be coupled sensors that detect a motion state of the vehicle, including a vehicle speed sensor 41, a yaw rate sensor 42, and an acceleration sensor 43.

The vehicle speed sensor 41 may be configured to detect the rotational speed, i.e., a wheel speed, of each wheel.

The vehicle speed sensor 41 may output a vehicle speed signal that periodically fluctuates at a frequency that is proportional to the rotational speed of the wheel.

The braking control unit 40 may be configured to calculate a traveling speed of the vehicle on the basis of an output of the vehicle speed sensor 41.

The yaw rate sensor 42 may be a yaw behavior detector that detects a yaw rate that is a speed of rotation around a vertical axis of the vehicle body.

The acceleration sensor 43 may be configured to detect an acceleration in a longitudinal direction and a lateral direction, i.e., a vehicle width direction, that acts on the vehicle body.

Outputs of these sensors may be used for various vehicle motion controls, including an anti-lock brake control, an attitude stabilization control, and a traction control described below.

The anti-lock brake control may reduce, when wheel lock occurs at the time of braking, for example, the brake fluid pressure of the wheel to recover the rotation of the wheel.

The attitude stabilization control may generate, in a case where the vehicle exhibits an oversteer behavior or an understeer behavior, a difference in braking force between left and right wheels to generate a yaw moment in a direction of suppressing these behaviors.

The braking control unit 40 may calculate a target yaw rate, i.e., a yaw rate that may be generated at the vehicle body while the vehicle is traveling normally, on the basis of a steering angle of a steering device acquired from an unillustrated steering control unit, the vehicle speed detected by the vehicle speed sensor 41, and the lateral acceleration detected by the acceleration sensor 43, for example.

The braking control unit 40 may set a direction and a magnitude of a yaw moment to be generated by control of braking force, in accordance with deviation between the yaw rate, i.e., an actual yaw rate, actually detected by the yaw rate sensor 42 and the target yaw rate.

In a case where an absolute value of the actual yaw rate is smaller than an absolute value of the target yaw rate, the braking control unit 40 may make the braking force on the turning inner wheel side larger than on the turning outer wheel side, assuming that the understeer behavior has occurred. The braking control unit 40 may thus generate a yaw moment in the same direction as the yaw rate in a steering angle direction, i.e., a steering direction, of the steering device.

In a case where the absolute value of the actual yaw rate is larger than the absolute value of the target yaw rate, the braking control unit 40 may make the braking force on the turning outer wheel side larger than on the turning inner wheel side, assuming that the oversteer behavior has occurred. The braking control unit 40 may thus generate a yaw moment in a direction opposite to the yaw rate in the steering direction of the steering device.

In addition, in a case where the braking control unit 40 detects a spin of a drive wheel, i.e., a wheel spin, on the basis of the outputs of the vehicle speed sensor 41 and the acceleration sensor 43, the braking control unit 40 and the engine control unit 20 may cooperatively perform the traction control of preventing the spin by suppressing the output of the engine and causing the brake of the wheel to generate braking force.

The braking control unit 40 may be further configured to output information to the user, such as the driver, via an unillustrated information output device, such as a sound output device, an indicator lamp, or an image display device.

The hydraulic control unit 50 may be a fluid pressure control device that individually adjusts the brake fluid pressure of the wheel cylinder 52 of each wheel.

The hydraulic control unit 50 may include, for example, an electric pump that applies pressure to a brake fluid, and a pressure increasing valve, a pressure reducing valve, and a pressure holding valve that control the brake fluid pressure of each wheel cylinder 52.

To the hydraulic control unit 50 may be coupled, via a brake fluid pipe, a master cylinder 51 and the wheel cylinder 52, for example.

The master cylinder 51 may be configured to apply pressure to the brake fluid, in response to an operation on an unillustrated brake pedal. The driver may perform a brake operation on the brake pedal.

The brake fluid pressure generated by the master cylinder 51 may be transmitted to the wheel cylinder 52 through the hydraulic control unit 50.

The hydraulic control unit 50 may be configured to detect the brake fluid pressure generated by the master cylinder 51.

The hydraulic control unit 50 may be configured to detect, on the basis of the fluid pressure, whether a brake operation is performed by the driver and intensity of the brake operation.

The hydraulic control unit 50 may be configured to increase or reduce the brake fluid pressure of each wheel cylinder 52, by increasing or reducing the brake fluid pressure generated by the master cylinder 51 on an as-needed basis.

The wheel cylinder 52 may be provided for each wheel. The wheel cylinder 52 may be configured to generate friction force, i.e., braking force, corresponding to the brake fluid pressure by, for example, pressing a brake pad against a disc rotor.

In a case where the uneven ground traveling mode described above is selected, the engine control unit 20, the transmission control unit 30, and the braking control unit 40 may be switched from a normal control state to a control state for a vehicle state that is suitable for uneven ground traveling.

To improve drivability on an uneven ground, the engine control unit 20 may change correlation between the operation amount of the accelerator pedal and the driver requested torque, i.e., output characteristics of the engine.

To enable high driving force to be obtained during the uneven ground traveling, the transmission control unit 30 may shift the target shifting ratio of the shifting mechanism 31 to the higher speed reducing ratio side, i.e., the lower-speed side, with respect to that during the normal traveling.

The transmission control unit 30 may also increase the engagement force of the transfer clutch of the AWD transfer 32 as compared with that during the normal traveling. The braking control unit 40 may perform, for example, a hill descent control of controlling the braking force of each wheel to keep the vehicle speed equal to or less than a predetermined value when the vehicle descends a hill, and a limited slip differential (LSD) control of, in a case where one or more wheels spin, braking the wheel to promote torque transmission to another wheel.

The vehicle 1 is configured to perform the stop holding control (e.g., an automatic vehicle hold) of, even if the driver releases the brake pedal when the vehicle is stopped, holding the braking force to hold the vehicle in a stopped state.

In a state in which the stop holding control is enabled, in a case where the driver removes his/her foot from the brake pedal, after the vehicle 1 makes a stop in response to the driver's brake operation, to interrupt the brake operation, the braking control unit 40 may instruct the hydraulic control unit 50 to hold the brake fluid pressure of the wheel cylinder 52, thereby keeping each wheel in a braked state. This allows the vehicle 1 to be held in the stopped state.

Thereafter, in a case where an accelerator pedal depression operation, i.e., a start operation, performed by the driver is detected on the basis of, for example, the output of the accelerator pedal sensor 21, the braking control unit 40 may instruct the hydraulic control unit 50 to reduce the brake fluid pressure of the wheel cylinder 52, thereby canceling the braking force.

The braking force based on the stop holding control may be canceled also in a case where a brake pedal depression operation performed by the driver is detected.

The braking control device according to the first example embodiment is configured to disable the stop holding control described above, in a case where the vehicle 1 is determined as traveling on an uneven ground.

Figure 2:
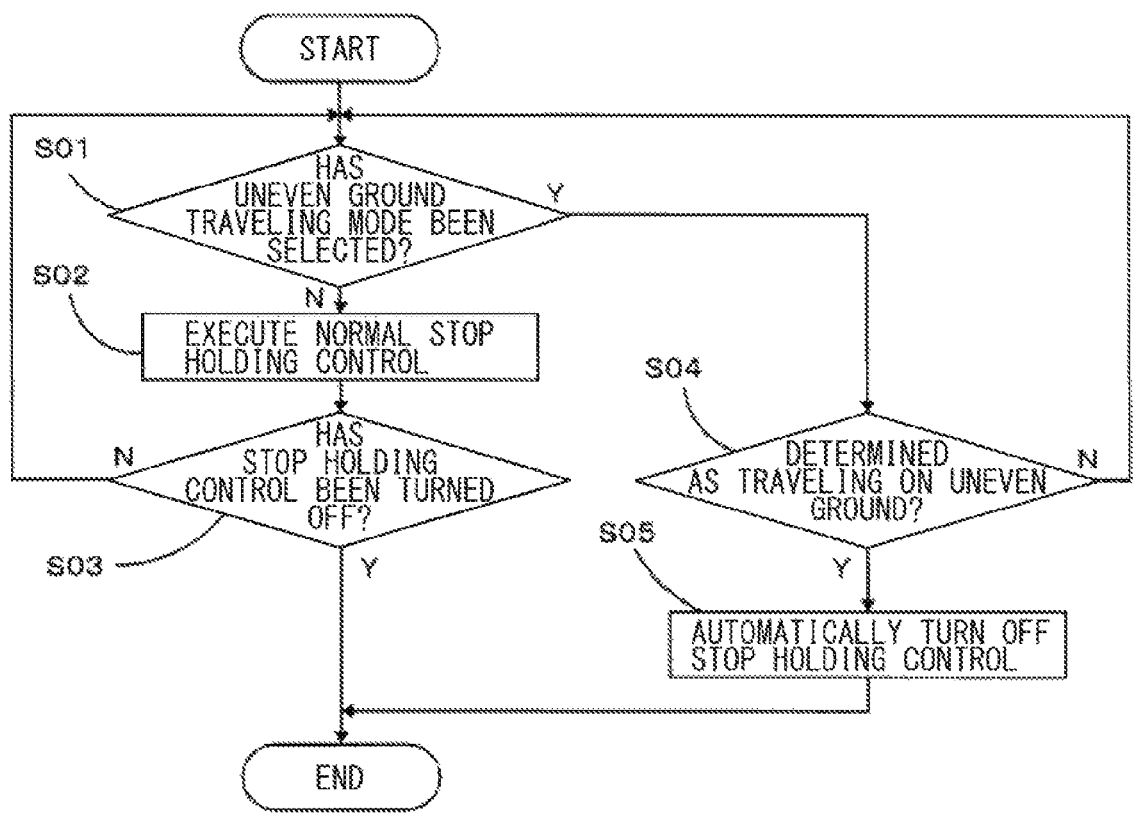
FIG. 2 is a flowchart illustrating operation related to disabling of a stop holding control during uneven ground traveling in the braking control device according to one example embodiment.

FIG. 2 is a flowchart illustrating operation related to disabling of the stop holding control during the uneven ground traveling in the braking control device according to the first example embodiment. This flow may be performed sequentially in a state in which the stop holding control is enabled.

The flow is described below in order of step.

[Step S01: Determination of Uneven Ground Traveling Mode Selection]

The body control unit 10 may determine whether the uneven ground traveling mode has been selected by the traveling mode selection switch 11.

In a case where the normal mode has been selected, i.e., a case where the uneven ground traveling mode has not been selected ("N" in step S01), the flow may proceed to step S02. In a case where the uneven ground traveling mode has been selected ("Y" in step S01), the flow may proceed to step S04.

[Step S02: Execution of Stop Holding Control]

The braking control unit 40 may execute the normal stop holding control described above.

Thereafter, the flow may proceed to step S03.

[Step S03: Stop Holding Control Off Determination]

The braking control unit 40 may determine whether the stop holding control has been turned off by the driver's start operation or an operation of turning off the stop holding control, for example.

In a case where the stop holding control has been turned off ("Y" in step S03), the series of processes may be ended, or a return may be made. Otherwise ("N" in step S03), the flow may return to step S01, and subsequent processes may be repeated.

[Step S04: Uneven-Ground Traveling Determination]

The braking control unit 40 may determine whether the vehicle 1 is traveling on an uneven ground.

For example, in a case where at least one of the following conditions holds, the braking control unit 40 may determine that the vehicle 1 is traveling on an uneven ground.

(1) A condition that the anti-lock brake control intervenes for two wheels or more, and that the deceleration at the time of the intervention is equal to or less than 0.4 G.

(2) A condition that the traction control intervenes for two wheels or more, and that the acceleration at the time of the intervention is equal to or less than 0.4 G.

(3) A condition that the attitude stabilization control intervenes, and that the lateral acceleration at the time of the intervention is equal to or less than 0.4 G.

Note that, in a case where any of the anti-lock brake control, the traction control, and the attitude stabilization control intervenes, some sort of slip state has occurred between a tire of the wheel and a road surface.

In a case where the braking control unit 40 determines that the vehicle 1 is traveling on an uneven ground ("Y" in step S04), the flow may proceed to step S05. Otherwise ("N" in step S04), the flow may return to step S01, and subsequent processes may be repeated.

[Step S05: Execution of Stop Holding Control Automatic-Off]

The braking control unit 40 may automatically turn off the stop holding control, and disable holding of the braking force based on the stop holding control.

At this time, the braking control unit 40 may report to the user, such as the driver, that the stop holding control has been automatically turned off, by using the unillustrated information output device.

A sound output device, such as a buzzer, or an indicator lamp or an image display device provided on an instrument panel, for example, may be used as the information output device.

For example, the braking control unit 40 may sound the buzzer, and may turn off the indicator lamp indicating an on state of the stop holding control.

Thereafter, the series of processes may be ended, or a return may be made.

As described above, according to the first example embodiment, example effects described below are achievable.

(1) In a case where the own vehicle is determined as traveling on an uneven ground, typically a low-µ road, execution of the stop holding control is disabled. Thus, even in a case where the driver forgets to turn off the stop holding control during the uneven ground traveling, it is possible to prevent occurrence of a slip in which the vehicle slips down with its wheel locked on a slope, for example, of the uneven ground.

In addition, it is possible to prevent erroneous cancellation due to superimposition of electrical noise on a sensor output, as compared with a case of cancelling the braking force in response to the driver's brake operation corresponding to start of the slip.

(2) It may be determined whether the own vehicle is traveling on an uneven ground on the basis of intervention of the anti-lock brake control, the traction control, or the attitude stabilization control due to a tire slip state, i.e., occurrence of the tire slip state. This makes it possible to appropriately determine the uneven ground traveling with a simple configuration, by using an output of a sensor provided in a typical vehicle to be used for the motion control of the vehicle.

(3) It may be determined whether the own vehicle is traveling on an uneven ground only in a case where an operation of selecting the uneven ground traveling mode is performed by the driver. Thus, whether the user, such as the driver, has recognized the uneven ground traveling, i.e., a result of the driver's subjective selection operation, is reflected in the determination of the uneven ground traveling, making it possible to determine the uneven ground traveling more appropriately.

Second Example Embodiment

Described next is a braking control device according to a second example embodiment of the technology.

In the second example embodiment, portions similar to those in the first example embodiment described above may be denoted with the same reference numerals to omit description, and differences will mainly be described.

In the second example embodiment, even in a state in which the normal mode is selected, it may be determined whether the vehicle 1 is traveling on an uneven ground on the basis of a determination condition different from that in a state in which the uneven ground traveling mode is selected.

Figure 3:
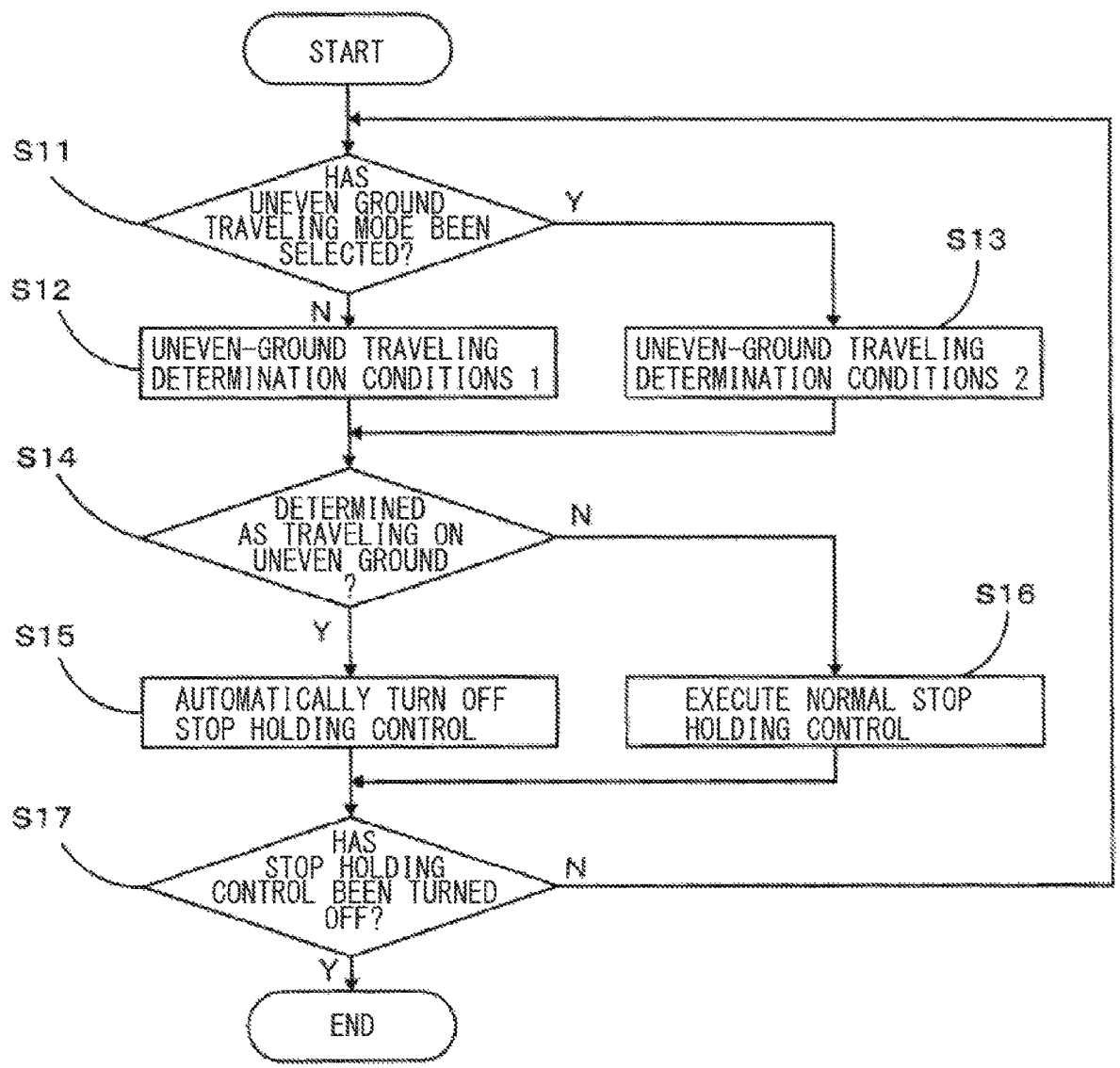
FIG. 3 is a flowchart illustrating operation related to disabling of a stop holding control during uneven ground traveling in a braking control device according to one example embodiment of the technology.

FIG. 3 is a flowchart illustrating operation related to disabling of the stop holding control during the uneven ground traveling in the braking control device according to the second example embodiment.

The flow is described below in order of step.

[Step S11: Determination of Uneven Ground Traveling Mode Selection]

The body control unit 10 may determine whether the uneven ground traveling mode has been selected by the traveling mode selection switch 11.

In a case where the normal mode has been selected, i.e., a case where the uneven ground traveling mode has not been selected ("N" in step S11), the flow may proceed to step S12. In a case where the uneven ground traveling mode has been selected ("Y" in step S11), the flow may proceed to step S13.

[Step S12: Setting of Uneven-Ground Traveling Determination Conditions 1]

The braking control unit 40 may set uneven-ground traveling determination conditions to conditions 1 given below.

In the conditions 1, an upper limit value of a vehicle body acceleration on the basis of which the uneven ground traveling is determined may be set lower than in conditions 2 to be described later.

(1) A condition that the anti-lock brake control intervenes for two wheels or more, and that the deceleration at the time of the intervention is equal to or less than 0.1 G.

(2) A condition that the traction control intervenes for two wheels or more, and that the acceleration at the time of the intervention is equal to or less than 0.1 G.

(3) A condition that the attitude stabilization control intervenes, and that the lateral acceleration at the time of the intervention is equal to or less than 0.1 G. Thereafter, the flow may proceed to step S14.

[Step S13: Setting of Uneven-Ground Traveling Determination Conditions 2]

The braking control unit 40 may set the uneven-ground traveling determination conditions to the conditions 2 given below.

(1) A condition that the anti-lock brake control intervenes for two wheels or more, and that the deceleration at the time of the intervention is equal to or less than 0.4 G.

(2) A condition that the traction control intervenes for two wheels or more, and that the acceleration at the time of the intervention is equal to or less than 0.4 G.

(3) A condition that the attitude stabilization control intervenes, and that the lateral acceleration at the time of the intervention is equal to or less than 0.4 G.

Thereafter, the flow may proceed to step S14.

[Step S14: Uneven-Ground Traveling Determination]

The braking control unit 40 may determine whether the vehicle 1 is traveling on an uneven ground, on the basis of the condition set in step S12 or step S13.

In a case where the braking control unit 40 determines that the vehicle 1 is traveling on an uneven ground ("Y" in step S14), the flow may proceed to step S15. Otherwise ("N" in step S14), the flow may proceed to step S16.

[Step S15: Execution of Stop Holding Control Automatic-Off]

The braking control unit 40 may automatically turn off the stop holding control, and disable holding of the braking force based on the stop holding control.

At this time, the braking control unit 40 may report to the user, such as the driver, that the stop holding control has been automatically turned off, by using the unillustrated information output device.

Thereafter, the flow may proceed to step S17.

[Step S16: Execution of Stop Holding Control]

The braking control unit 40 may execute the normal stop holding control.

Thereafter, the flow may proceed to step S17.

[Step S17: Stop Holding Control Off Determination]

The braking control unit 40 may determine whether the stop holding control has been turned off by the driver's start operation or an operation of turning off the stop holding control, for example.

In a case where the stop holding control has been turned off ("Y" in step S17), the series of processes may be ended, or a return may be made. Otherwise ("N" in step S17), the flow may return to step S11, and subsequent processes may be repeated.

As described above, according to the second example embodiment, effects similar to those of the first example embodiment described above are achievable. In addition, the uneven ground traveling may be determined even in a case where the uneven ground traveling mode is not selected, and the stop holding control may be turned off in a case where the own vehicle is determined as traveling on an uneven ground. This makes it possible to prevent a slip of the vehicle.

In addition, the uneven-ground traveling determination condition may be varied depending on whether the uneven ground traveling mode is on or off. Thus, in a case where the user selects the uneven ground traveling mode to use the hill descent control, for example, on a high-μ road, it is possible to prevent the uneven ground traveling from being determined erroneously even though the vehicle is actually not traveling on an uneven ground.

[Modifications]

The technology is not limited to the example embodiments described above, and various modifications and alternations may be made for each of the example embodiments. Such various modifications and alternations also belong to the technical scope of the technology.

(1) The configurations of the vehicle and the braking control device are not limited to those in the example embodiments described above, and may be changed as appropriate.

For example, although the example embodiments describe, as an example, the vehicle using the engine as the traveling power source, the technology may be applied also to, for example, an engine-and-electric hybrid vehicle using an engine and a motor generator, and an electric vehicle using only a motor generator as a traveling power source. Examples of the electric vehicle may include a so-called pure EV and a fuel cell vehicle (FCV).

(2) The uneven-ground traveling determination conditions according to the example embodiments are examples, and may be changed as appropriate.

For example, in place of or in combination with the techniques of the example embodiments, the uneven ground traveling on an icy or snowy road, etc. may be determined on the basis of an image of a road surface captured by an imaging device.

In another example, a road surface friction coefficient may be estimated, and the uneven ground traveling may be determined in a case where the estimated friction coefficient is equal to or less than a predetermined value.

In another example, on the basis of fluctuation, or variation, in the output of the vehicle speed sensor, i.e., a wheel speed sensor, the uneven ground traveling may be determined in a case where the output fluctuates greatly.

(3) According to the example embodiments, the braking force based on the stop holding control may be generated by, for example, the hydraulic service brake. Alternatively, the braking force may be generated by another type of brake, for example, an electric brake, such as an electric service brake or an electric parking brake.

In another example, the braking force may be generated by a parking lock mechanism provided in the transmission.

As described above, at least one embodiment of the technology makes it possible to prevent the vehicle from slipping due to the stop holding control on an uneven ground.

The braking control unit 40 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the braking control unit 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the braking control unit 40 illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A braking control device for a vehicle, the braking control device comprising:
 a stop holding controller configured to, after the vehicle makes a stop and a brake operation performed by a driver who drives the vehicle is canceled, perform a stop holding control that includes holding braking force of the vehicle and canceling the braking force in response to a predetermined start operation performed by the driver; and
 an uneven-ground traveling determination unit configured to determine whether the vehicle is traveling on an uneven ground before the vehicle stops and the stop holding controller performs the stop holding control, wherein
 the stop holding controller is configured, even after the vehicle stops and the brake operation performed by the driver is canceled, not to perform the stop holding control in response to the uneven-ground traveling determination unit determining that the vehicle is traveling on the uneven ground before the vehicle stops and the stop holding controller performs the stop holding control.

2. The braking control device according to claim 1, wherein the uneven-ground traveling determination unit is configured to determine that the vehicle is traveling on the uneven ground upon determining a slip state is detected at one or more wheels of the vehicle.

3. The braking control device according to claim 1, wherein
 the vehicle has traveling modes including a normal mode for traveling on a smooth road and an uneven ground traveling mode for traveling on an uneven ground, which are selectable by a user of the vehicle, and
 the uneven-ground traveling determination unit is configured to determine whether the vehicle is traveling on the uneven ground only in a case where the uneven ground traveling mode is selected.

4. The braking control device according to claim 2, wherein
 the vehicle has traveling modes including a normal mode for traveling on a smooth road and an uneven ground traveling mode for traveling on an uneven ground, which are selectable by a user of the vehicle, and
 the uneven-ground traveling determination unit is configured to determine whether the vehicle is traveling on the uneven ground only in a case where the uneven ground traveling mode is selected.

5. The braking control device according to claim 1, wherein
 the vehicle has traveling modes including a normal mode for traveling on a smooth road and an uneven ground traveling mode for traveling on an uneven ground, which are selectable by a user of the vehicle, and
 the uneven-ground traveling determination unit is configured to vary a condition on a basis of which the uneven-ground traveling determination unit determines whether the vehicle is traveling on the uneven ground, between a case where the uneven ground traveling mode is selected and a case where the normal mode is selected.

6. The braking control device according to claim 2, wherein
 the vehicle has traveling modes including a normal mode for traveling on a smooth road and an uneven ground traveling mode for traveling on an uneven ground, which are selectable by a user of the vehicle, and
 the uneven-ground traveling determination unit is configured to vary a condition on a basis of which the uneven-ground traveling determination unit determines whether the vehicle is traveling on the uneven ground, between a case where the uneven ground traveling mode is selected and a case where the normal mode is selected.

7. The braking control device according to claim 5, wherein the uneven-ground traveling determination unit is configured to:
 determine that the vehicle is traveling on the uneven ground only in a case where an acceleration that acts on a vehicle body of the vehicle is equal to or less than a predetermined upper limit value; and
 set the upper limit value lower in the case where the normal mode is selected, than in the case where the uneven ground traveling mode is selected.

8. The braking control device according to claim 6, wherein the uneven-ground traveling determination unit is configured to:
 determine that the vehicle is traveling on the uneven ground only in a case where an acceleration that acts on a vehicle body of the vehicle is equal to or less than a predetermined upper limit value; and
 set the upper limit value lower in the case where the normal mode is selected, than in the case where the uneven ground traveling mode is selected.

9. A braking control device for a vehicle, the braking control device comprising circuitry configured to:
 after the vehicle makes a stop and a brake operation performed by a driver who drives the vehicle is canceled, perform a stop holding control that includes holding braking force of the vehicle and canceling the braking force in response to a predetermined start operation performed by the driver;
 determine whether the vehicle is traveling on an uneven ground before the vehicle stops and the stop holding control is performed; and even after the vehicle stops and the brake operation performed by the driver is canceled, not to perform the stop holding control in response to determining that the vehicle is traveling on the uneven ground before the vehicle stops and the stop holding control is performed.

* * * * *